United States Patent Office 2,846,321
Patented Aug. 5, 1958

2,846,321

POLISHING COMPOSITION AND METHOD

Paul E. Wenaas, Clarendon Hills, and Carl S. Miner, Jr., Winnetka, Ill., assignors to Simoniz Company, a corporation of Delaware No Drawing. Application March 6, 1956
Serial No. 569,691

12 Claims. (Cl. 106—10)

This invention relates to polishing compositions and methods of making polishing compositions.

This application is a continuation-in-part of our application Serial No. 329,456, filed January 2, 1953, now abandoned.

In the U. S. patent of Paul E. Wenaas, 2,681,859, dated June 22, 1954, and included in this application by reference, there is disclosed and claimed a liquid polishing composition including a solvent and a wax both dissolved and dispersed therein at ordinary room temperatures so that the composition contains small discrete particles comprising wax. The composition also includes a silicone fluid dissolved in the solvent. Liquid polishing compositions of this type have been found to be particularly useful in applying protective coatings to surfaces and to give these surfaces a high luster. The composition, after it has been applied and dried, requires relatively little rubbing to produce a high polish.

The liquid polishing composition of this invention, when used for automobiles, furniture and the like, preferably includes about 78 parts by weight of a solvent, about 0.75 to 7.25 parts by weight of a wax, and about 0.5 to 5.45 parts by weight of silicone fluid. In certain instances, such as in producing an automobile polish, or the like, from 0 to about 1.5 parts by weight of an additive may be included. The upper limits of the ranges of the wax and silicone amounts are somewhat higher than those in the above-mentioned Wenaas patent.

The undissolved portion of the wax, which is contained in the small particles, apparently aids in obtaining a smooth uniform coating of the polish and of the wax on the treated surface.

It has been discovered, however, that the average size of these particles and their uniformity are very important and should be closely controlled for best results. Thus, if the particles are too large, the liquid upon being applied to the surface tends to draw up and form separated clusters so that it is impossible to obtain uniform wetting and coating. If the particles are too fine, the dried coating is difficult to wipe smooth as the surface becomes streaked and has a dull and hazy appearance. The methods of this invention permit accurate control between these two extremes so that superior compositions are produced. Furthermore, the methods of the invention result in products wherein the particles comprising wax are remarkably uniform in diameter.

One of the features of this invention is the preparation of a polish composition including a solvent and a wax dissolved and dispersed therein by an improved method comprising preparing a heated, concentrated wax solution by completely dissolving the wax in a portion of the solvent at an elevated temperature and then adding the concentrated solution to a cooled portion of solvent, the temperature of the cooled portion of solvent plus the added concentrate being maintained substantially constant, within a relatively narrow range, during the addition and the total amount of solvent being insufficient to dissolve all of the wax at ordinary room temperature in order that discrete particles will be precipitated containing a part of the wax.

Another feature of the invention is to provide an improved polish composition containing dissolved and dispersed wax in a solvent with the dispersed wax being contained in discrete, substantially uniform particles, the particles being precipitated by adding a heated solution of wax to a cooled portion of solvent while maintaining the mixture of solvent and added solution at a substantially uniform temperature.

Other features and advantages of the invention will be apparent from the following description of the invention including certain embodiments thereof.

According to the methods of this invention, a composition is produced in which the particles containing the undissolved wax are substantially uniform and the range of size of the particles is easily controlled to produce polishing compositions having predictable polishing characteristics. The desired precise control of particle size, particularly in commercial production, have heretofore been practically impossible even by using a homogenizer or by grinding the wax in a colloidal mill.

According to the methods of this invention about 4 to about 93%, and preferably about 7 to about 37% of the solvent is first heated and the melted wax is added to the heated solvent to produce a wax concentrate solution. The temperature of this concentrate is preferably maintained between about 130 to 200° F. with the preferred temperature being about 5 to 10° F. above the minimum temperature required to keep the wax in solution. The amount of solvent in the concentrate and the temperature of the concentrate should be sufficient to dissolve all of the wax. Preferably, the concentrate contains about 1.1 to 4.2 pounds of wax per gallon of concentrate.

This heated concentrate is then added to the remaining portion of the solvent while this remaining portion is maintained at a fixed temperature that is preferably between about 35–90° F. and that preferably does not vary over about 5° F. during the addition of the concentrate. During the addition the mixture is gently stirred so as to obtain thorough mixing without excessive agitation.

After the concentrate has been thusly added to the cooled solvent, the excess wax precipitates out and fine, substantially uniform, particles are produced. This composition, when used in a polish, produces a liquid polish that is easy to apply and that covers the surface substantially uniformly.

When the silicone fluid is used in the polishing composition, this silicone may be added at any point in the above-described process. When an additive, such as wool wax alcohol, is used in the polishing composition, this additive is preferably added to the heated concentrate.

In the preferred method when the solvent is a hydrocarbon mineral spirit, the wax is an oxidized microcrystalline wax and the silicone is a dimethylpolysiloxane fluid, the amount of solvent in the concentrate is preferably about 15–17% of the total solvent and the temperature of the cooled solvent and of the mixture of solvent and concentrate during the addition is dependent at least in part on the concentration of the wax in the concentrate. Thus, when the amount of wax in the concentrate is about 2.4 pounds per gallon, the temperature of the mixture is preferably maintained at about 60° F.; when this amount is 2.7 pounds of wax per gallon, the temperature of the mixture is preferably about 60° F. When the concentration of wax is relatively small, however, the temperature of the mixture can be less. Thus, where the concentration is about 2.1 pounds of wax per gallon in the concentrate, the temperature is preferably about 57° F.

The amount of solvent used to make the concentrate is quite variable and this amount is controlled primarily by practical considerations. Thus, if too much solvent is used, problems are encountered in reducing the temperature of the remainder of the solvent sufficiently low to maintain the required low final temperature. Thus, such procedures raise refrigeration and heat transfer problems and increase the cost of heating the concentrate. If too small an amount of solvent is used in the concentrate, there is danger of the wax being insufficiently dissolved and it becomes necessary to raise the temperature of the concentrate to an excessively high degree.

In general, about 4% to about 93%, and preferably from about 7 to about 37%, of the total solvent should be used in the concentrate. Where the amount of solvent in the concentrate is at the high end of the range, the temperature of the concentrate should be at the low end of the temperature range. Similarly, when the solvent is at the low end of its range, the temperature should be at the high end of its range.

As is pointed out in the above Wenaas patent, 2,681,859, if an additive is used it may be a mixture of lanolin alcohols such as "Ceralan." The additive, when used, is preferably present in an amount up to about 1.5 parts by weight. The solvent that is employed is preferably a hydrocarbon solvent that has sufficient volatility to dry in a reasonably short time after the composition has been applied to a surface and that is capable of dissolving a portion of the wax at ordinary temperatures and of dissolving the silicone fluid and the additive when an additive is used.

The preferred solvents are hydrocarbon solvents and specifically naphthas. Among the suitable solvents are "Amsco Naphthol Mineral Spirits"; Amsco LEP solvent made by American Mineral Spirits Co. and having an initial boiling point of 313° F. and a dry end point of 349° F.; "Amsco Naphthol Spirits" also made by American Mineral Spirits Co., having an initial boiling point of 307° F. and a dry end point of 337° F.; "Shell 360" solvent made by Shell Oil Company and having an initial boiling point of 310° F. and a dry end point of 355° F.; "Skellysolve S-2" made by Skelly Oil Company and having an initial boiling point of 309° F. and a dry end point of 326° F.; and "Amsco Special Naphthol" made by American Mineral Spirits Co. and having an initial boiling point of 310° F. and a dry end point of 349° F.

Among the waxes that may be used in this invention are microcrystalline waxes, oxidized microcrystalline waxes, polyethylene, oxidized polyethylene, carnauba, beeswax, hydrogenated castor oil, and mixtures thereof. A wax that has been found effective is a microcrystalline wax and preferably an oxidized microcrystalline wax. An excellent wax for this purpose is "Crown 23" oxidized microcrystalline wax.

The liquid silicone fluid that may be used in this invention includes those containing chains of dialkylsiloxane units and preferably dimethylpolysiloxane units. These silicone fluids preferably have a viscosity of about 20 to about 1,000 centistokes at 100° F. Preferable dimethylpolysiloxanes are "DC-200" and "GE-SF-96," each within a range of about 40 to about 300 centistokes viscosity when measured at 100° F. Other suitable silicone fluids include the following: A polysiloxane containing 90% dimethyl groups and 10% methyl phenyl groups identified as "DC-510," polymethylvinylsiloxane identified as "RXF-522," a silicone resin of the methyl phenyl copolymer siloxane containing from about 30 mol percent to about 95 mol percent of trifunctional silicone atoms in which the ratio of methyl to phenyl groups is between 80:20 to 20:80 and identified as "General Electric 81556" (formerly identified as "GE 81531"), a dimethylpolysiloxane of 10,000 centistokes viscosity with the end of the molecule containing a monofunctional polysiloxane group and identified as General Electric "Viscasil 10,000," and methylchlorophenylpolysiloxane, which is a copolymer containing about 83% of methyl groups and about 17% chlorophenyl groups with about 3-10% of the polysiloxane being chlorine and identified as "General Electric 81406."

In one example of preparing the liquid polishing composition for use on automobile bodies 175 pounds of "Crown 23" oxidized microcrystalline wax was melted with 42 pounds of wool wax alcohol (lanolin alcohols) at a temperature not exceeding 210° F. The melted waxes were added to 150 gallons of "Amsco" mineral spirits and the mixture agitated to insure solution of all of the wax and alcohols.

The remainder of 1000 gallons of solvent, or 850 gallons, was maintained in a precipitation kettle at a temperature of about 40° F. The above concentrate at a temperature of 135-140° F. was then added to the solvent in the precipitation kettle as a coarse spray while the mixture in the precipitation kettle was maintained at about 40° F.

During the addition the mixture was gently agitated in order to insure thorough mixing. As soon as all of the concentrate had been added, the agitation was continued while the mixture was slowly brought up to room temperature.

During the above addition of the concentrate to the cool solvent, fine, discrete, substantially uniform particles containing the excess portion of wax precipitated out. At this point 83 pounds of GE dimethylpolysiloxane fluid having a viscosity of 40 centistokes at 100° F. were added. The resulting polish, when applied to an automobile, wet the surface thoroughly and upon drying formed a substantially uniform coating on the surface. The coating was easily wiped smooth to produce a high luster.

In one example of preparing a furniture polish according to the methods of this invention, 335 pounds of Crown 23 wax were melted at a temperature not exceeding 220° F. The melted wax was added to 160 gallons of "Amsco" solvent maintained at a temperature between 150 and 170° F. and the mixture stirred until all the wax had been dissolved. This concentrate was then added to 840 gallons of Amsco solvent which was cooled to a temperature of about 57° F. before and during the addition. The concentrate was added in the form of a coarse spray while the cool solvent mixture was gently agitated. Agitation was then continued while the temperature was permitted to raise slowly to room temperature. If desired, any suitable type of dye may be added depending upon the shade of furniture surface upon which the polish is to be used.

The excess wax in the above furniture polish, like that in the previously described automobile polish, was found to be contained in the small, discrete, substantially uniform particles that were produced. The silicone fluid set out in the previous example but having a viscosity of 300 centistokes at 100° F. was added in an amount of about 209 pounds.

As illustrated by the above examples, the furniture polish is preferably prepared under slightly different conditions from the automobile polish as the furniture polish is used in a different environment. Thus, it is preferred that the particles containing the excess wax should be somewhat smaller in the furniture polish, than those in the automobile polish. Furthermore, a higher concentration of wax is preferably used. The furniture polish preferably uses a more viscous silicone in order to get an improved gloss, for example.

The term "wax" used herein is intended to include the true waxes as well as wax-like materials.

Having described our invention as related to certain embodiments thereof, it is our intention that the invention be not limited by any of the details of description, unless otherwise specified, but rather be construed broadly within its spirit and scope as set out in the accompanying claims.

We claim:
1. In the preparation of a polish composition including a solvent and a wax both dissolved and dispersed therein, the method comprising: preparing a concentrated wax solution by completely dissolving the wax in a portion of solvent at an elevated temperature sufficiently high to bring about said dissolving and adding said concentrated solution to a cooled portion of solvent, the temperature of the cooled portion of solvent plus the added concentrate being maintained substantially constant during the addition, the total amount of solvent being insufficient to dissolve all the wax at ordinary room temperature in order that a part of the wax will be precipitated in discrete particles.

2. In the preparation of a polish composition including a solvent and a wax both dissolved and dispersed therein, the method comprising: preparing a concentrated wax solution by completely dissolving the wax in from about 4% to about 93% by weight of the total solvent at an elevated temperature sufficiently high to bring about said dissolving and adding said concentrated solution to the cooled remaining portion of solvent, the temperature of the cooled portion of solvent plus the added concentrate being maintained substantially constant during the addition, the total amount of solvent being insufficient to dissolve all the wax at ordinary room temperature in order that a part of the wax will be precipitated in discrete particles.

3. In the preparation of a polish composition including a solvent and a wax both dissolved and dispersed therein, the method comprising: preparing a concentrated wax solution by completely dissolving the wax in a portion of solvent at an elevated temperature of about 130° F. to about 200° F. and adding said concentrated solution to a cooled portion of solvent, the cooled portion of solvent plus the added concentrate being maintained at a substantially constant temperature that is between about 35° F. to about 90° F. during the addition, the total amount of solvent being insufficient to dissolve all the wax at ordinary room temperature in order that a part of the wax will be precipitated in discrete particles.

4. In the preparation of a polish composition including a solvent and a wax both dissolved and dispersed therein, the method comprising: preparing a concentrated wax solution by completely dissolving the wax in from about 4% to about 93% by weight of the total solvent at an elevated temperature of about 130° F. to about 200° F. and adding said concentrated solution to the cooled remaining portion of solvent, the cooled portion of solvent plus the added concentrate being maintained at a substantially constant temperature that is between about 35° to 90° F. during the addition, the total amount of solvent being insufficient to dissolve all the wax at ordinary room temperature in order that a part of the wax will be precipitated in discrete particles.

5. In the preparation of a polish composition including a solvent and an oxidized microcrystalline wax both dissolved and dispersed therein, the method comprising: preparing a concentrated solution of the oxidized microcrystalline wax by completely dissolving the wax in a portion of the solvent at a temperature of about 130° to about 200° F. and adding said concentrated solution to a cooled portion of the solvent, the cooled portion of solvent plus the added concentrate being maintained at a substantially constant temperature that is between about 35° to 90° F. during the addition and the total amount of solvent being insufficient to dissolve all the wax at ordinary room temperature in order that a part of the wax will be precipitated in discrete particles.

6. In the preparation of polish composition including a solvent and an oxidized microcrystalline wax both dissolved and dispersed therein, the method comprising: preparing a concentrated solution of the oxidized microcrystalline wax by completely dissolving the wax in about 4% to 93% by weight of the total solvent at a temperature of about 130° to about 200° F. and adding said concentrated solution to a cooled portion of the solvent, the cooled portion of solvent plus the added concentrate being maintained at a substantially constant temperature that is between about 35° to 90° F. during the addition and the total amount of solvent being insufficient to dissolve all the wax at ordinary room temperature in order that a part of the wax will be precipitated in discrete particles.

7. In the preparation of a polish composition including a hydrocarbon mineral spirits solvent and an oxidized microcrystalline wax both dissolved and dispersed therein, the method comprising: preparing a concentrated solution of the oxidized microcrystalline wax by completely dissolving the wax in about 17% by weight of the solvent at a temperature of about 130 to about 200° F. and adding said concentrated solution to the remaining 83% of solvent while maintaining said remaining solvent and added concentrate at a substantially constant temperature that is between about 35–90° F. during the addition, the total amount of solvent being insufficient to dissolve all the wax at ordinary room temperature in order that a part of the wax will be precipitated in discrete particles.

8. In the preparation of a polish composition including a polysiloxane fluid, a solvent and a wax both dissolved and dispersed therein, the method comprising: preparing a concentrated wax solution by completely dissolving the wax in a portion of solvent at an elevated temperature sufficiently high to bring about said dissolving; adding said concentrated solution to a cooled portion of solvent, the temperature of the cooled portion of solvent plus the added concentrate being maintained substantially constant during the addition, the total amount of solvent being insufficient to dissolve all the wax at ordinary room temperature in order that a part of the wax will be precipitated in discrete particles; and dissolving said polysiloxane fluid in the solvent.

9. In the preparation of a polish composition including a dimethylpolysiloxane fluid, a hydrocarbon mineral spirits solvent and an oxidized microcrystalline wax both dissolved and dispersed therein, the method comprising: preparing a concentrated solution of the oxidized microcrystalline wax by completely dissolving the wax in about 17% by weight of the solvent at a temperature of about 130 to about 200° F., adding said concentrated solution to the remaining 83% of solvent while maintaining said remaining solvent and added concentrate at a substantially constant temperature that is between about 35–90° F. during the addition, the total amount of solvent being insufficient to dissolve all the wax at ordinary room temperature in order that a part of the wax will be precipitated in discrete particles; and dissolving said dimethylpolysiloxane fluid in the solvent.

10. A polish composition prepared by the method of claim 1.

11. A polish composition prepared by the method of claim 6.

12. A polish composition prepared by the method of claim 9.

References Cited in the file of this patent

UNITED STATES PATENTS

| | | |
|---|---|---|
| 2,596,829 | Trusler | May 13, 1952 |
| 2,681,859 | Wenaas | June 22, 1954 |